INVENTORS
ROBERT BEN BOOTH
WILLIAM FINAN LINKE

INVENTORS
ROBERT BEN BOOTH
WILLIAM FINAN LINKE
BY *Samuel Branch Walker*

ATTORNEY.

United States Patent Office 3,147,218
Patented Sept. 1, 1964

3,147,218
SEPARATING MINERAL FINES WITH CATIONIC POLYACRYLAMIDES
Robert B. Booth and William F. Linke, Stamford, Conn., assignors to American Cyanamid Company, New York, N.Y., a corporation of Maine
Filed Apr. 24, 1959, Ser. No. 808,782
7 Claims. (Cl. 210—54)

This invention relates to a method of accelerating and/or improving the efficiency of separation of aqueous ore pulps and suspensions of finely-divided minerals by adding a water-soluble cationic polyacrylamide from the co-polymerization of an acrylamide and a diallyl quaternary ammonium compound.

Synthetic water-soluble polyelectrolytes have been used for the settling of mineral fines and other suspensions. British Patent 725,460, "Improvements Relating to the Process of Facilitating the Dewatering of Aqueous Suspensions of Finely-Divided Minerals," dated April 7, 1953, American Cyanamid Company, and British Patent 760,279, "Improvements Relating to the Treatment of Acidic Ore Pulps and Acidic Suspensions of Minerals," American Cyanamid Company, dated July 23, 1954, describe in some detail settling procedures using broad groups of water-soluble polyelectrolytes including polyacrylamides. Pye and Patterson Canadian Patent 522,851, March 20, 1956, "Method of Separating Solids From Aqueous Suspension," describes the use of certain acrylamide polymers with from 0.8% to 10% of the amide groups replaced by carboxyl groups and having a solution viscosity of at least 4 centipoises in a 0.5% by weight aqueous solution at a pH of 3 to 3.5 at 21.5° C. Pye Canadian Patent 522,850, March 20, 1956, "Separation of Minerals," describes the use of polymers of acrylamide in concentrating and separating solids from liquid suspensions thereof and stresses the importance of minimal agitation after the addition of the polymer.

The cationic polyacrylamide of the present invention has a molecular weight of at least 10,000 and may have a molecular weight of several million. Molecular weights of this magnitude are most easily characterized by a measurement of intrinsic viscosity, which is a measurement regularly employed by polymer chemists in working with high molecular weights. As used in the present specification the term "intrinsic viscosity" is a value, expressed in deciliters per gram of polymer, which is proportional to the effective hydrodynamic volume or size of the polymer in solution at zero concentration; i.e., at infinite dilution. See J. Polymer Science, vol. 5, pages 745-7 (1950). This value must be distinguished from ordinary viscosity as measured in centipoises, since the latter term expresses the relationship of the resistance to flow of the liquid being measured to that of water at 68.4° F.

The intrinsic viscosity is determined from the rate of flow of dilute solutions in solvents such as 0.1 normal or 1.0 normal aqueous sodium chloride or aqueous sodium nitrate at 30° C. and at several concentrations. The ratio of the viscosity of the solution of the polymer at any one concentration to the viscosity of the solvent, as measured at 30° C., is the relative viscosity ($N_r$) at this concentration. This value minus one is equal to the specific viscosity ($N_{sp}$). The intrinsic viscosity is determined by plotting the ratio of the specific viscosity ($N_{sp}$) to the concentration of polymer against the concentration of the polymer and extrapolating the resultant plot to zero concentration. Ordinary viscosities are easily measured directly in standard instruments such as the Brookfield Viscosimeter in which a spindle is rotated at a definite speed in the polymer solution and the resistance to motion is measured in centipoises.

Molecular weight studies based on light scattering and other indicia have shown that the weight average molecular weight of a polyacrylamide is expressed accurately by the formula:

Intrinsic viscosity in deciliters per gram
$$= 3.73 M^{0.66} \times 10^{-4}$$

wherein M is the weight average molecular weight.

The cationic polyacrylamides used in practicing the present invention have a weight average molecular weight of at least about 10,000, and preferably greater. Molecular weights in the range of several million give excellent results. The polymers of the higher molecular weights dissolve more slowly. Any polymer which is not too high in molecular weight to dissolve gives good results.

The cationic polyacrylamide of this invention may be used for settling a wide variety of materials. It may be used as the sole flocculating agent or in conjunction with conventional flocculating agents to clarify water for domestic or industrial purposes, and in the flocculation, settling, thickening and dewatering processes used on flotation concentrates and tailings, liquors from leaching minerals and ore materials with water or solutions of acids, alkalies, cyanides, etc., chemical precipitates including fine insoluble calcium, magnesium, and uranium salts, various industrial waste products including those from electroplating, paper processing, deinking, tanning, and food processing, also mine wastes, and effluents from washeries and plants treating sand and gravel, cement materials, iron ores, coal, and phosphate rock, also textiles wastes, domestic and industrial sewage, foundry wastes, also suspensions employed in processing various industrial minerals such as clays, fillers, coating materials, asbestos, metallic oxides, pigments, and the like.

The cationic polyacrylamide of this invention improves the filtration rate when the above-listed and like suspensions are dewatered by filtration methods. In addition, the handling of filter cakes and dewatered products is facilitated in that these products are firm and can be removed readily from filtration equipment.

Cationic polyacrylamide may be used alone or employed in conjunction with conventional settling agents such as alums, aluminum sulfate, calcium chloride, lime, iron salts, glues, gelatins, starches, cellulose derivatives, and the like. Cationic polyacrylamide is particularly useful for settling and filtration of mineral suspensions and ore pulps which contain finely-divided predominantly non-argillaceous materials.

The present polymers are useful over a wide pH range giving good results over the entire pH range conventionally used in mining operations and additionally give good flocculation, settling or filtration with or without added electrolytes. The present cationic polyacrylamide is particularly and unexpectedly useful in alkaline solutions. Usually in commercial mining operations soluble material is present in the ore, although additional electrolyte may be added.

The polyacrylamides are usually added to suspensions as solutions in water in concentrations of 0.01–5%. It is common practice to make up stock solutions of 0.25–1% in strength by feeding the polymer by vibrating or aspirator-type feeders into water under good agitation and then dilute such solutions to 0.1% or lower for feeding as flocculating agents. To achieve the highest efficiency with any polymer, thorough distribution of the polymer in the suspension should be effected and such may be obtained by stage feeding and by the use of as dilute solutions of the added polymer as practically possible without causing over dilution of the suspensions undergoing treatment. Undue agitation of the suspension after the addition of the polymer should be avoided.

The polyacrylamides may be used in aqueous solutions at any temperature at which the water exists in the liquid phase, that is, from 32° F. to boiling. In the following descriptions and examples the temperature will be understood to be room temperature of about 70 to 80° F. unless otherwise specified.

Uranium leaching operations are conveniently carried out at room temperature. More rapid leaching is usually obtained at elevated temperatures but heating requires a high cost for fuel, so as a compromise the circuits are usually maintained at around 120 to 125° F. The settling is usually somewhat more rapid at such slightly elevated temperatures because the viscosity of water becomes less as the temperature is increased.

The present cationic polyacrylamide gives a more rapid settling and particularly yields a clearer supernatant phase or overflow phase than ordinary polyacrylamide.

Cationic polyacrylamide is particularly effective in alkaline solutions. On the acid side, silica is near its isoelectric point, and a clear supernatant is more easily obtained. In alkaline solutions, such as are used in leaching uranium ores high in calcium, a cloudy supernatant is obtained with ordinary polyacrylamide, or anionic polyacrylamide and in fact the settling line can become obscure, so that a classification type of settling occurs. With the present cationic polyacrylamide, a clear supernatant is obtained.

The cationic polyacrylamides are highly effective as fluidizing agents for ore suspensions of varying particle size ranges, and maintain the ore pulp as an integrated mass so as to prevent separation of the coarser fractions from the fines and slime portions, even in alkaline leaching. This prevents clogging of agitators in leaching operations, during stoppages and power outages and aids in the pumping and movement of ore pulps by maintaining them in a highly mobile state.

For treating ore pulps and mineral suspensions at a solids content of at least 1%, cationic polyacrylamides give preferred results at a usage of from 0.001 to not more than about 1 pound per ton of solids. For turbid water, or dilute wastes where the solids content is below 1% down to a few parts per million, a higher usage of cationic polyacrylamide, up to at least 10 pounds per ton of suspended solids, is indicated.

The term "flocculation" in conjunction with the settling of solids is usually used to denote flocculation, aggregation and settling as from a practical standpoint the problem is separating a solid and a liquid phase rather than a theoretical approach to the particular phenomenon taking place.

The same polymers which give superior results in flocculation normally give superior results in filtration.

The polymers to be used in this invention are those prepared from acrylamides, including substituted acrylamides in which the alpha hydrogen and/or one or more of the amide hydrogens may be replaced with methyl groups and diallyl amino or ammonium compounds in which the nitrogen has substituents which may be alkyl, aryl or aralkyl radicals or a polymethylene bridge. The sum total of carbon atoms in these other substituents should be less than 9 for best results. With unduly large substituents on the ammonium nitrogen the cationic characteristics of the nitrogen are masked by the steric hindrance of substituents. Similarly the substituents may have inert groups such as halogen groups, etc. thereon. The substituent groups should be free from ethylenic unsaturation which would lead to cross linking or insolubilizing effect which would unduly affect the solubility of the polymer. Amide groups, amine groups, halogen groups or hydroxyl groups do not interfere with the effectiveness of the polymer in the separation of finely-divided minerals, but such substituent groups normally are not necessary.

The use of a diallyl compound in an essentially linear ethylenic polymerizaton is most unusual. The results obtained seem to be consistent with the theory that in the free radical copolymerization of acrylamide, and the diallyl compound, one of the ethylenic alkyl groups reacts by the ordinary free radical mechanism to add on to the polymer chain, and then the other ethylenic bond in the other allyl group reacts by an intramolecular rearrangement to close a ring giving N,N-disubstituted piperidine rings in the polymer chain. The occurrence of piperidine nitrogen in the chain gives a cationic quality to the polymer, and yet does not result in cross linking or insolubility. Such a mechanism is described by George B. Butler and Rudolph J. Angelo, Journal of American Chemical Society, 79, 3128 (1957); "Preparation and Polymerization of Unsaturated Quaternary Ammonium Compounds VIII. A Proposed Alternating Intramolecular-Intermolecular Chain Propagation."

While it is not desired that the present application be limited to a particular theory of chain structure or mechanism of polymerization, the facts appear to be consistent with the polymer having the general structure

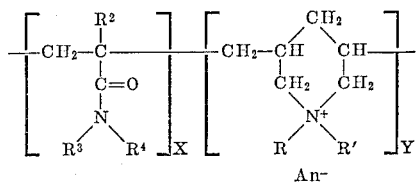

where An⁻ is a water-soluble anion, and R and R' are selected from the group consisting of individually, alkyl, aryl and aralkyl radicals, and together, a polymethylene bridge, the sum total of carbon atoms in R and R' being less than 9 and said R and R' being free from ethylenic unsaturation and reactive groups, and each of $R^2$, $R^3$ and $R^4$ are independently selected from the group consisting of —H and —$CH_3$, said polyacrylamide having a weight average molecular weight of at least about 10,000.

The ratio of acrylamide units to the piperidine units formed from the diallyl ammonium compounds is preferably in the range from 100:1 to 2:1. With less than 1 mol percent of the quaternary ammonium compound present, the cationic characteristics of the polymer are not sufficiently effective for best results. From about 2 mol percent up of the cationic groups gives preferred results.

If less than about two-thirds of the chain links are from acrylamides, the polyacrylamide characteristics are unduly affected and the polymer is no longer essentially a polyacrylamide, costs increase, and an economic maximum has been passed.

The use of methyl substituents on the acrylamide, or of larger alkyl groups or aryl groups on the diallyl ammonium salt increases the bulk of the polymer, and may be alternatively used, although unsubstituted acrylamide units and dimethyl diallyl ammonium salts give more economical operation in the absence of unusual economic considerations. Similarly the most convenient ammonium salt is the chloride salt or bromide salt. Salts of other anions may be used including fluorides, iodides, sulfates, nitrates, etc. In use, such soluble anions dissociate and in effect leave the charged polymer independent of the source salt used in the introduction of the cationic polyacrylamide in the system.

The present polymers may be made by conventional polymerization procedures. Free radical catalysts such as peroxides, persulfates, perborates, perchlorates, azobisisobutyronitrile, etc. may be used in conjunction with normal polymerization procedures. Redox catalyst systems such as mixtures of water-soluble reducing agents such as tertiary amines, ferrous salts, sulfites with oxidizing agents such as water-soluble persulfates, such as alkali metal or ammonium persulfates, give good results. Water-soluble chlorates or bromates such as alkali metal chlorates or bromates with water-soluble sulfite reducing agents such as sodium sulfite or sodium bisulfite also give good results.

The molecular weight of the acrylamide copolymers can be controlled by varying the reaction conditions. As a rule, the molecular weight decreases with increasing reaction temperature and increasing concentration of the catalyst. Addition of chain transfer agents such as mercaptans, alcohols, etc. will further decrease the molecular weight. These techniques are well known to the chemists in the field of polymerization.

The accompanying drawings show the settling effect of certain polymers.

EXAMPLE 1

*Preparation of Diallyldimethyl Ammonium Chloride ("DADM")*

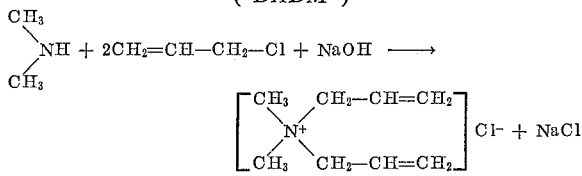

Figure 1:
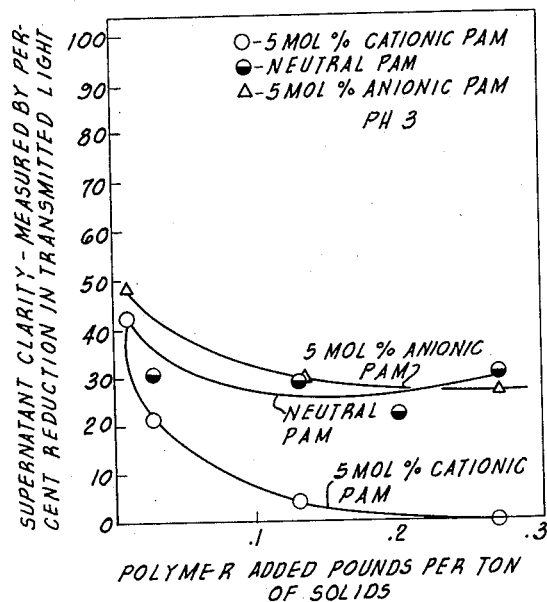
FIGURE 1 shows the improvement in clarity of the supernatant liquid, as measured by reduction of transmitted light, using silica fines at pH 3.

To a 12-liter, 3-necked flask fitted with a thermometer, a stirrer, a carbon dioxide snow condenser, and a dropping funnel is added 1125 g. (10.0 moles) of a 40% aqueous solution of dimethylamine. Allyl chloride, 750 g. (9.8 moles), is added dropwise with vigorous stirring at a rate limited by the vigorousness of the reflux due to the exothermic nature of the reaction. The addition requires about 1 hour. By the end of this period the temperature is found to rise to 57° C. The dropping funnel is next filled with a solution of 400 g. of sodium hydroxide in 400 g. of water, and addition thereof is carried out dropwise with stirring. All the alkali solution is added in 1 hour's time, the reflux temperature remaining at 57° C. After standing for about 16 hours, 1545 g. (20.2 moles) of allyl chloride is added slowly, during stirring, through the dropping funnel. The addition requires about 1½ hours, and reflux is maintained by gentle heating on a steam bath. The solution is subsequently refluxed for 6½ hours at 46° C. during which time the acidity of the solution drops to pH 5.

A sample of the reaction mixture, adjusted to pH>10 with aqueous sodium hydroxide, does not liberate any volatile amine on boiling, as indicated by a test with moist red litmus paper. This indicates that all of the dimethylamine has been quaternarized. The reaction mixture is stripped in vacuo on a water pump to remove excess allyl chloride and then diluted with water to a solution containing 36% diallyldimethyl ammonium chloride and 13% sodium chloride by weight.

The diluted solution is treated with finely divided decolorizing carbon for about 16 hours, after which the carbon is removed by filtration, and an aliquot of the pale yellow solution is titrated potentiometrically with standard acid. The absence of secondary and tertiary amines is established in this manner. The decolorized solution exhibits an iodine number of 113 cgs. $I_2$/g. and a total solids content of 48.5%. On the basis of these determinations, the solution contains, by weight, about 36.0% diallyldimethyl ammonium chloride and about 12.5% sodium chloride.

EXAMPLE 2

*Preparation of Cationic Polyacrylamide*

A 1-liter, 3-necked flask is equipped with a thermometer, mechanical stirrer, gas-inlet tube, reflux condenser, and three dropping funnels. The first dropping funnel contains 90 g. (95.5 mol percent) of acrylamide and 28 g. of a 36% solution of diallyldimethyl ammonium chloride (4.5 mol percent), in 102 g. of water. The second funnel contains 0.13 g. of ammonium persulfate in 40 g. of water and the third contains 0.065 g. of potassium metabisulfite in 40 g. of water. The solution in the first funnel is adjusted to pH 2.5 by the addition of a few drops of 6 N sulfuric acid. Approximately 25% of each of the catalyst solutions and 25% of the aqueous monomeric mixture are added simultaneously to the reaction flask. An immediate exotherm to 48° C. is observed. A stiff gel forms in the flask and cannot be stirred. The gel is dissolved in 200 ml. of added water, and the copolymerization is continued with the addition of the remaining 75% of the reactants and catalysts in seven equal portions over a 45-minute period. The temperature of the reaction mixture is held between 38–42° C. during the addition. A subsequent heating period of 3 hours duration at 40° C. is also carried out. The resulting viscous solution is diluted to 10% active solids by the addition of 500 ml. of water. This solution exhibits a pH of 2 and a Brookfield viscosity of 70,000 cps. The iodine number is 2.9 g. of iodine per g. of solution. A determination of free acrylamide in the copolymer solution by polarographic techniques indicates that the linear copolymer contains, by weight 92.5% acrylamide and 7.5% diallyldimethyl ammonium chloride combined in the copolymer molecule, which corresponds to 96.6 mol percent acrylamide and 3.4 mol percent diallyldimethyl ammonium chloride.

EXAMPLE 3

*Settling with Cationic Polyacrylamide*

A 0.1% by weight solution in water of cationic polyacrylamide is prepared by dissolving the polymer containing 96.6 mol percent acrylamide and 3.4 mol percent diallyldimethyl ammonium chloride as prepared in Example 2 in water.

An easily reproducilbe convenient test of the settling efficacy of a polymer is conducted using a 0.1% solution of the polymer in water in settling tests of fine silica, minus 120 mesh and about 28% minus 10 microns in particle size, contained in 1000 milliliter cylinders of sufficiently uniform bore that the variation of the distance between the 1000 milliliter mark and the 600 milliliter mark does not exceed 5 millimeters for the set. Samples are agitated with a stainless steel plunger having a disc diameter of about two inches, a thickness of ⅟₃₂ inch and about eighteen ³⁄₁₆ inch holes spaced symmetrically over the disc. A ⅛ inch diameter 24 inch handle is welded to the center of the disc.

The silica is pretreated as follows: one hundred and fifty grams of silica plus or minus 0.5 gram has added thereto about 300 milliliters of distilled water and is allowed to soak overnight. The silica is slurried in the water with a spatula, poured into a cylinder, thereto is added 10 milliliters of 0.10 normal sulfuric acid, and the slurry diluted to the 800 milliliter mark on the graduate. The mixture is allowed to soak for one hour and has a pH of around 3.4 to 3.6. A test quantity of flocculating agent is diluted to 300 milliliters in distilled water, the slurry of silica is stirred with the plunger, and the solution of flocculating agent poured into the graduate bringing the volume to 1100 milliliters. Six plunges, that is, six strokes down and six strokes up, over a period of six seconds without aeration or air entrainment gives uniform dispersion. The suspension is then allowed to settle and the time between when the top of the settling pulp layer passes the 1000 milliliter mark and when it passes the 600 milliliter mark is taken as a settling time. The rate of settling is calculated by dividing the distance in centimeters between the 1000 and 600 milliliters marks by the recorded settling time.

The polymer is used in amounts of 0.4 pound per ton of suspended solids. The settling rate, calculated as described above, is 0.44 centimeter per second as compared to a rate of 0.02 centimeter per second for a similar suspension of silica to which no polymer is added.

EXAMPLE 4

*Comparison of Anionic, Neutral and Cationic Polyacrylamide*

Three polyacrylamides of intrinsic viscosity of 5.7 deciliters per gram are prepared as follows using the method described in Example 2.

(1) *Neutral polyacrylamide.*—Containing essentially 100% amide groupings in its structure.

(2) *Anionic polyacrylamide.*—Containing about 95 mol percent amide groupings and 5% carboxyl groups in its structure; formed by copolymerizing acrylamide and acrylic acid. Mol percent and weight percent are almost the same for the copolymer.

(3) *Cationic polyacrylamide.*—Formed by copolymerizing 95 mols acrylamide and 5 mols diallyldimethyl ammonium chloride (about 11% cationic groupings by weight).

Separate settling tests conducted with 0.05, 0.1, 0.2 and 0.3 pound per ton of the above-described polymers show that at a pH of about 3.5, using the silica test as described in Example 3, without changing the pH, the settling rate and clarity of supernatant are superior with the cationic polyacrylamide to that obtained from either the anionic or neutral polyacrylamide of the same molecular weight.

For the 5 mol percent cationic polyacrylamide this standard settling test showed:

| Pounds Polymer Per Ton Suspended Solids | Settling Rate in Centimeters per Second |
|---|---|
| 0.013 | 0.200 |
| 0.027 | 0.245 |
| 0.13 | 0.430 |
| 0.77 | 0.405 |

One of the most important qualities of flocculants used in the uranium mining industry is the ability to leave clear supernatant liquids after the flocs have settled. The supernatant liquid, which contains the dissolved uranium extracted from the ore, is processed by passing it through an ion exchange resin column, which removes and concentrates the dissolved metal. The presence of mineral fines, suspended haze, or floc fragments in the supernatant tends to clog the ion exchange columns. Usually the solutions are filtered to remove such suspended solids. These filters also become clogged by the mineral fines and require frequent cleaning. The value of a flocculant is greatly increased by an ability to remove part or all of the very fine suspended matter from the solution, in addition to the ability to form rapidly settling flocs. In this type of application, a flocculant which gives fast settling but leaves a cloudy supernatant or overflow would not be completely satisfactory. Even if the supernatant is not sufficiently clear to pass through the ion exchange resins, the clearer the supernatant from the settling step, the easier and more rapid is a polishing filtration step, and the more solution which can be treated before the filters need be cleaned.

Quantitative measurements of the quantity of material left suspended after the flocs have settled may be made in various ways. For example, a known volume of the supernatant liquid may be removed and filtered through a weighed Gooch crucible, and the total weight of suspended fines determined. The residue thus found is usually reported as parts per million parts of solution but may be reported as percentage of original solid unflocculated, etc. Although this procedure gives excellent results, and reproducible results, a more rapid procedure is preferred for a detailed investigation of the nature of the suspended haze. Each sampling, as removed, disturbs the system, and thus it is not possible to study the amount of suspended haze as a function of time, height above the flocs or depth from the liquid surface, etc. of a single uninterrupted run. Also, gravimetric analysis is time consuming.

It is more convenient and much faster to determine the relative amounts of suspended solids left after flocculation by passing light through the liquid and measuring the amount scattered by the remaining solids. This is done by measuring the amount of light passing through the liquid with a photocell. When the liquid is very turbid, the amount of light scattered is very high and hence the amount of light transmitted is low. The method is empirical, and for different particle size ranges, is not strictly proportional to parts per million of solids. For a given suspension system the results are highly reproducible, convenient to handle and indicative of the desired settling efficiency, and very fast.

As one satisfactory method, the tests were carried out in 1-liter graduated cylinders that were illuminated by two fluorescent lamps of twenty watts each a fixed distance behind the cylinder. By means of a frame, acting as a mask, only a limited portion of the cylinder, between the 700 and 900 cc. marks, was illuminated, reducing spurious scattering. During the measurement the cylinder was surrounded by a shielding box which eliminated the effects of background and room lighting, and reflections. The photocell was held directly against the glass wall of the cylinder and the reading taken. All readings were taken at a fixed time, 200 seconds, after the mixing of the samples. Extensive testing by this method, and related measurements, at other levels in the liquid above the flocs, and for longer periods of time showed that the selected conditions were sensitive and reproducible.

The amount of scattered and absorbed light was determined as the difference between the foot candles of light transmitted with pure water in the cylinder and the foot candles transmitted through the supernatant liquids and is expressed as a percentage. This value was taken as a measure of the amount of suspended solids left unflocculated by the added polymer. Duplicate measurements agreed to within 5%. Because the measurement is a percentage of a standard, pure water, the exact construction of the system is not important, and calibration is rapid and accurate. This reduction in the transmission of light is shown in the tables below.

The cationic polymer is superior to neutral or anionic polymers in removing fine particles from the solution by incorporating them in the flocs and leaving very little suspended matter. This advantage becomes more marked as the amount of polymer used is increased. The following table shows the amount of suspended silica solids left by three acrylamide polymers (PAM) of the same intrinsic viscosity when used at pH 3 as measured by the percentage of light lost in transmission, using the above photocell system:

REDUCTION IN TRANSMISSION OF LIGHT

| Amount of Polymer Added, lbs./ton solids | 5 mol percent Cationic PAM, percent | Neutral PAM, percent | 5 mol percent Anionic PAM, percent |
|---|---|---|---|
| .013 | 42 | 42 | 48 |
| .027 | 22 | 31 | |
| .13 | 4.5 | 29 | 29 |
| .20 | | 23 | |
| .27 | about 0 | 31 | 27 |

FIGURE 1 shows this data in graphic form.

The improvement of the present cationic polyacrylamide over its anionic or neutral counterpart is more marked in more alkaline solutions. At a higher pH the higher surface charge on the mineral surface makes flocculation more difficult. Cloudy supernatants are obtained with anionic or neutral polyacrylamide if finely divided materials are present. The cationic polymer neutralizes the surface charge and maintains settling effectiveness over a wider pH range. This can be seen in the following tables which show the reduction in the transmission of light by the supernatant liquid at pH 5.5:

REDUCTION IN TRANSMISSION OF LIGHT

| Amount of Polymer Added, lbs./ton | 5 mol percent Cationic PAM, percent | Neutral PAM, percent | 5 mol percent Anionic PAM, percent |
|---|---|---|---|
| .013 | 86 | 91 | 92 |
| .13 | 4.4 | 47 | 55 |

Figure 2:
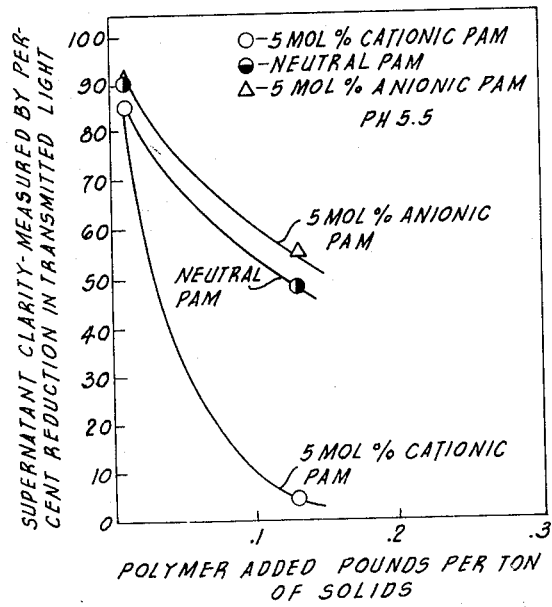
FIGURE 2 shows comparable clarity curves at pH 5.5.

FIGURE 2 shows this data in graphic form.

The advantage of the cationic polyacrylamide is marked at low polyacrylamide usage; and is outstanding at higher polyacrylamide usage rates.

At a still higher pH, data shows the cationic polyacrylamide is comparatively even more effective.

At pH 10 the results are spectacular:

REDUCTION IN TRANSMISSION OF LIGHT

| Amount of Polymer Added, lbs./ton solids | 5 mol percent Cationic PAM, percent | Neutral PAM, percent | 5 mol percent Anionic PAM, percent |
|---|---|---|---|
| .013 | 99.9 | 99.9 | 99.9+ |
| .13 | 77 | 96 | 99.9 |

Figure 3:
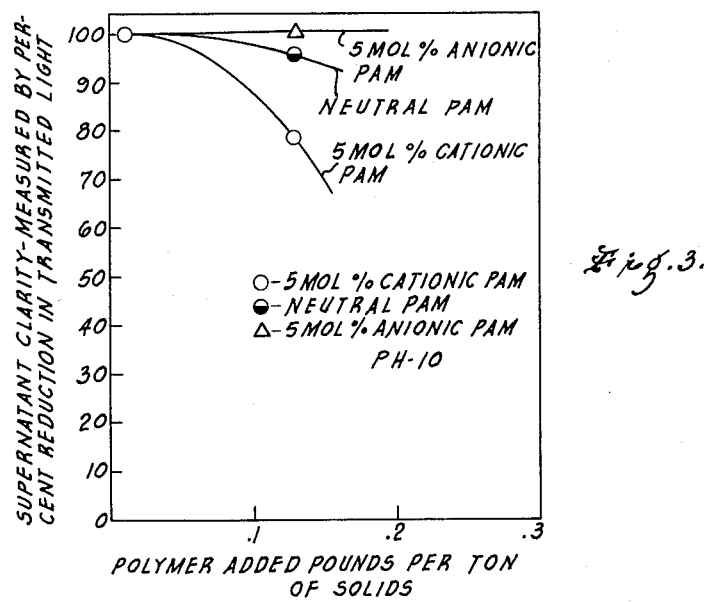
FIGURE 3 shows comparable clarity curves at pH 10.

FIGURE 3 shows this data in graphic form.

EXAMPLE 5

Experiments of the type described in Example 1 are repeated with neutral polymers and polymers containing 1, 5, 13, 1 and 30 mol percent anionic and cationic groupings of intrinsic viscosity 3.1, 13.0 and 22.0. The polymers are prepared by copolymerization of acrylamide with acrylic acid or diallyldimethyl ammonium chloride using the type polymerization described in Example 2. In all cases the cationic polymers produced more complete flocculation with fast settling rates and improvements in clarity.

EXAMPLE 6

Large flocs pack with more voids than small flocs or unflocculated material. The settled flocs can be pumped because of these liquid spaces. In other words, a compact mass that can be worked is obtained.

The volume of the settled flocs is directly related to the average floc size and hence the total flocculation of the system, and is frequently used as for instance by A. S. Michaels—Ind. Eng. Chem. 46, 1485–90 (1954)—as a measurement of the degree of flocculation.

Samples of 5 grams of silica were suspended in 25 milliliters of water in 30 milliliter test tubes, the pH adjusted with hydrochloric acid or sodium hydroxide, and uniformly dispersed by stoppering the test tube and turning end over end. Then to each sample was added 0.1 milligram of the polymer dissolved as a 0.1% solution in water. The samples were again turned end over end to mix, allowed to stand 15 minutes, and the sediment height measured. Four polyacrylamides of intrinsic viscosity of about 5.7 deciliters per gram were used.

|  | Relative Settled Volume | | | |
|---|---|---|---|---|
|  | pH 2.5 | pH 5.5 | pH 9.5 | pH 13 |
| No flocculant mm | 14.0 | 14.0 | 14.0 | 14.0 |
| 5 mol percent anionic PAM mm | 22.0 | 19.5 | 14.5 | 18.0 |
| Neutral PAM mm | 22.5 | 21.0 | 18.0 | 18.5 |
| 2 mol percent cationic PAM mm | 22.5 | 22.0 | 20.0 | 22.0 |
| 5 mol percent cationic PAM mm | 22.0 | 22.5 | -------- | 20.5 |

Figure 4:
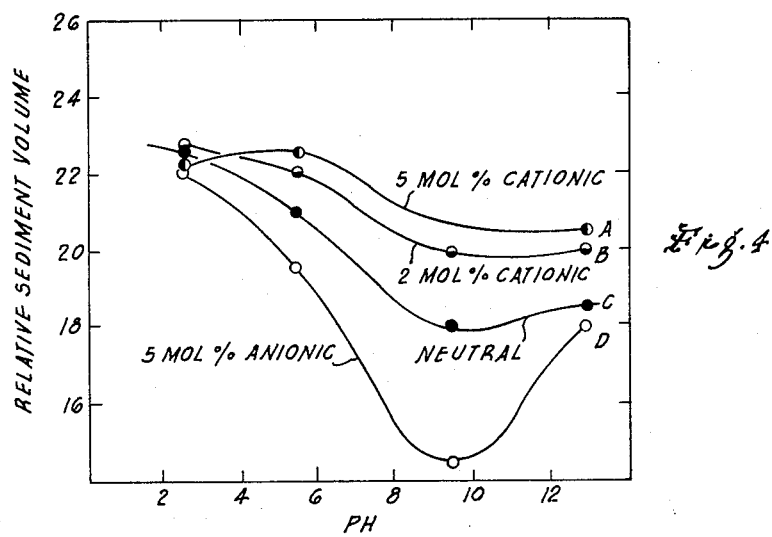
FIGURE 4 shows the relative sediment volume obtained with various polyacrylamides.

Figure 4 shows these data in graphic form.

FIGURE 4 shows these data in graphic form.

EXAMPLE 7

A copolymer of N,N-dimethyl-acrylamide and dimethyldiallyl ammonium chloride is prepared and used as a flocculant for fine silica in the above-described settling test method. This polymer is added in amounts of 0.013 pound per ton of suspended solids. The resulting settling rate is 0.04 centimeter per second.

EXAMPLE 8

A Canadian uranium ore was ground, leached with sulfuric acid and washed by countercurrent decantation. The feed to the washing system was about 25% solids and its pH was 1.8–2.0. To separate 1000 milliliter samples of this feed, polymers were added as follows:

Test A.—0.04 pound per ton of the cationic polyacrylamide #3 of Example 4.

Test B.—0.05 pound per ton of an anionic polyacrylamide intrinsic viscosity of 5.8 and containing about 5 mol percent acrylic acid linkages.

Test C.—Similar to Test B with 0.2 pound per ton animal glue. The suspensions were allowed to settle and the volumes of the settled solids noted at 0.5 minute intervals as follows:

| Time, Minutes | Volume (ml.) of Settled Solids | | |
|---|---|---|---|
|  | Test A | Test B | Test C |
| 0 | 1,000 | 1,000 | 1,000 |
| 0.5 | 900 | 935 | 940 |
| 1.0 | 815 | 845 | 850 |
| 1.5 | 765 | 780 | 780 |
| 2.0 | 690 | 700 | 695 |
| 2.5 | 640 | 650 | 640 |
| 3.0 | 575 | 590 | 595 |
| 3.5 | 535 | 555 | 550 |
| 4.0 | 490 | 520 | 515 |
| Suspended Solid (p.p.m.) in Supernatant Liquid | 85 | 210 | 110 |

The cationic polymer gave the most rapid settling rate and the lowest content of suspended solids in the supernatant liquid.

EXAMPLE 9

A Canadian uranium ore was ground and classified hydraulically prior to acid leaching. It was necessary to thicken the classifier overflow to avoid excessive dilution during acid leaching and the cationic polyacrylamide of Test A of Example 8 was compared to a combination of the conventional polyacrylamide (intrinsic viscosity = 5.8 deciliters per gram) and glue, which is the standard flocculant for this overflow. The pH of the overflow was 6.8 and 1000 milliliter samples were used in comparing the flocculants. In thickening these samples to 68% solids, 0.020 pound per ton of the cationic polyacrylamide duplicated the settling rate obtained with 0.025 pound per ton of conventional polyacrylamide used in combination 0.24 pound per ton of animal glue. The supernatant liquid from the test with the cationic polymer contained 157 parts per million suspended solids as compared to 285 parts per million from the test with the polyacrylamide and glue combination.

EXAMPLE 10

Filtration tests were conducted on suspensions of minus 200 mesh silica (2000 grams silica:6000 grams water) containing a high percentage of slime material with a vacuum filter leaf of 0.1 square foot area which was placed in the pulp for a period of 2 minutes. Water was filtered from the pulp at the rate of 220 milliliters per minute.

On a similar suspension of silica treated with 0.06 pound per ton of the cationic polyacrylamide described in Example 4 and containing 5 mol percent cationic groupings in its structure, water was filtered from the pulp at the rate of 326 milliliters per minute.

EXAMPLE 11

Suspensions of various types of fine solids of 1000 milliliter volume were treated with cationic polyacrylamide as described in Example 3. The time of free settling between the 1000 and 600 milliliter graduation marks on the cylinder was noted. In all cases a similar untreated sample of each suspension was observed as a control test. In all such control tests incomplete settling of the suspended solids was noted in sharp contrast to the clarity of the supernatant liquids produced by treatment with the cationic polyacrylamide. The results of these settling tests are summarized in the following table.

| Suspension, Type | Cationic Polyacrylamide | | | |
|---|---|---|---|---|
| | Percent Solids Content | Mol Percent Cationic Groups | dl./g. Intrinsic Viscosity | lb./ton Used | Settling Time, Seconds |
| Limestone | 15 | 11 | 5.8 | 0.02 | 40 |
| Coal Plant Effluent | 4.3 | 4 | 13.0 | 0.04 | 79 |
| Copper Flotation Concentrate | 20 | 20 | 5.8 | 0.02 | 76 |
| Copper Flotation Tailing | 13.6 | 2 | 18.0 | 0.02 | 58 |
| Cyanidation Tailing | 19.7 | 5 | 5.7 | 0.01 | 62 |
| Alkaline leached Uranium ore | 22 | 5 | 5.7 | 0.06 | 96 |

We claim:

1. A process of separating aqueous ore pulps and mineral suspensions containing finely-divided minerals which comprises: adding to said ore pulps and mineral fines, having a pulp density of less than about 70% by weight solids, under flocculating conditions, a water-soluble cationic polyacrylamide of the formula:

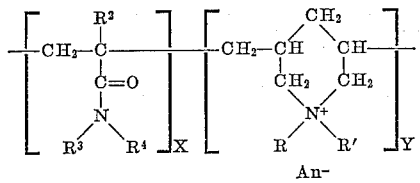

where An⁻ is a water-soluble anion, and R and R' are selected from the group consisting of individually, alkyl, aryl and aralkyl radicals, and together, a polymethylene bridge, the sum total of carbon atoms in R and R' being less than 9 and said R and R' being free from ethylenic unsaturation and reactive groups, and each of $R^2$, $R^3$ and $R^4$ are independently selected from the group consisting of —H and —$CH_3$, said polyacrylamide having a weight average molecular weight of at least about 10,000, and the ratio of X to Y being at least about 2 to 1; said polymer being added at the rate of 0.001 to 10 pounds per ton of solids to flocculate and agglomerate said finely-divided minerals, and separating the flocculated and agglomerated solids from the aqueous liquid.

2. A process of separating aqueous ore pulps and mineral suspensions containing finely-divided minerals which comprises: adding to said ore pulps and mineral fines, having a pulp density of less than about 70% by weight solids, under flocculating conditions, a water-soluble cationic polyacrylamide which in ionized form has the formula:

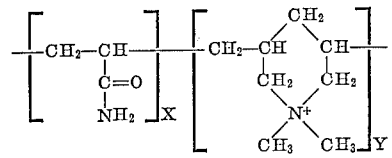

having a weight average molecular weight of at least about 10,000, and the ratio of X to Y being at least about 2 to 1; in an amount sufficient to flocculate and agglomerate said finely-divided minerals, and separating the flocculated and agglomerated solids from the aqueous liquid.

3. The process of claim 2 in which the polyacrylamide is added at the rate of 0.001 to 10 pounds per ton of solids.

4. The process of claim 2 in which the aqueous ore pulps and mineral suspensions contain more than 1% solids, and the polyacrylamide is added at the rate of 0.001 to 1 pound per ton of solids.

5. A process of settling aqueous acidic ore pulps and acidic mineral suspensions containing finely-divided minerals produced by the acid leaching of uranium bearing material which comprises treating said ore pulps and mineral suspensions having a pulp density of not more than about 60% solids with a water-soluble cationic polyacrylamide of the formula:

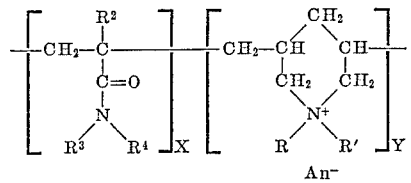

where An⁻ is a water-soluble anion, and R and R' are selected from the group consisting of individually, alkyl, aryl and aralkyl radicals, and together, a polymethylene bridge, the sum total of carbon atoms in R and R' being less than 9 and said R and R' being free from ethylenic unsaturation and reactive groups, and each of $R^2$, $R^3$ and $R^4$ are independently selected from the group consisting of —H and —$CH_3$, said polyacrylamide having a weight average molecular weight of at least about 10,000, and the ratio of X to Y being at least about 2 to 1; said polymer being added at the rate of 0.001 to 10 pounds per ton of solids to flocculate and agglomerate said finely-divided minerals, and settling the flocculated and agglomerated solids from the aqueous liquid.

6. A process of settling aqueous acidic ore pulps and acidic mineral suspensions containing finely-divided minerals produced by the acid leaching of uranium bearing material which comprises treating said ore pulps and mineral suspensions having a pulp density of not more than about 60% solids with a water-soluble cationic polyacrylamide which in ionized form has the formula:

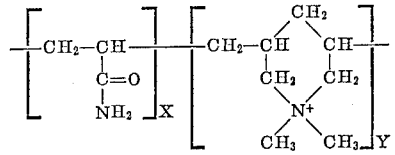

having a weight average molecular weight of at least about 10,000 the ratio of X to Y being at least about 2 to 1 in an amount sufficient to flocculate and agglomerate said finely-divided minerals, and settling the flocculated and agglomerated solids from the aqueous liquid.

7. The process of claim 6 in which the polyacrylamide is added at the rate of 0.001 to 1 pound per ton of solids, and the solids are allowed to settle from the aqueous liquid.

References Cited in the file of this patent

UNITED STATES PATENTS

| 2,923,701 | Schuller et al. | Feb. 2, 1960 |
| 2,995,512 | Weidner et al. | Aug. 8, 1961 |

FOREIGN PATENTS

| 154,799 | Australia | Jan. 19, 1954 |
| 163,501 | Australia | June 22, 1955 |